United States Patent

Asakawa et al.

Patent Number: 6,103,686
Date of Patent: Aug. 15, 2000

[54] CHELATING COMPOSITION

[75] Inventors: Miaki Asakawa, Hyogo; Yasutaka Sumida, Osaka; Masatoshi Shimomura, Hyogo; Shuichi Okuno, Hyogo; Tadanobu Morimoto, Hyogo; Masanao Morita, Hyogo; Hitoshi Suenaga, Hyogo, all of Japan

[73] Assignees: Nippon Shokubai Co. Ltd.; Teikoku Chemical Industries Co., Ltd., both of Osaka-fu, Japan

[21] Appl. No.: 09/116,173

[22] Filed: Jul. 16, 1998

[30] Foreign Application Priority Data

Jul. 16, 1997 [JP] Japan .................................. 9-191537
Apr. 16, 1998 [JP] Japan .................................. 10-106736

[51] Int. Cl.$^7$ .................................................. C11D 15/00
[52] U.S. Cl. .......................................... 510/479; 510/480
[58] Field of Search .................................. 510/488, 480, 510/499, 505, 479, 471, 477

[56] References Cited

U.S. PATENT DOCUMENTS

| | | | |
|---|---|---|---|
| 3,637,511 | 1/1972 | Yang ........................................ | 252/527 |
| 3,954,858 | 5/1976 | Lamberti et al. ..................... | 260/535 P |
| 5,015,468 | 5/1991 | Connor et al. .......................... | 424/55 |
| 5,646,271 | 7/1997 | Stehlin et al. ........................ | 536/123.1 |
| 5,670,082 | 9/1997 | Stehlin et al. ...................... | 252/186.42 |
| 5,695,679 | 12/1997 | Christie et al. ..................... | 252/186.26 |
| 5,902,783 | 5/1999 | Lagnemo et al. ........................ | 510/375 |
| 5,905,160 | 5/1999 | Shimomura et al. ................... | 549/531 |

FOREIGN PATENT DOCUMENTS

| | | |
|---|---|---|
| 0 513 948 A2 | 11/1992 | European Pat. Off. . |
| 708078 | 4/1996 | European Pat. Off. . |
| 772971 A2 | 11/1996 | European Pat. Off. . |
| 22 20 295 | 11/1972 | Germany . |
| 5-170714 | 7/1993 | Japan . |
| 5-202392 | 8/1993 | Japan . |
| 6-33096 | 2/1994 | Japan . |
| 7-26296 | 6/1994 | Japan . |
| 7-238300 | 9/1995 | Japan . |
| 9-176694 | 7/1997 | Japan . |
| WO 93/23515 | 11/1993 | WIPO . |
| WO 97/30210 | 8/1997 | WIPO . |

*Primary Examiner*—John R. Hardee
*Attorney, Agent, or Firm*—Fish & Richardson P.C.

[57] ABSTRACT

A chelating composition containing an aliphatic polycarboxylic acid of the following formula (I):

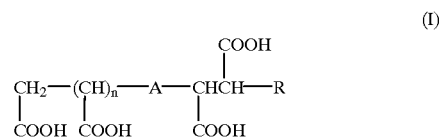

wherein A is an imino group or an oxygen atom, R is a hydrogen atom or a hydroxyl group, and n is 0 or 1, or the salt thereof and sugar or saccharic acid of 4 to 12 carbon atoms at such a ratio as enables the components to manifest synergistic effects is provided. This chelating composition is capable of effectively sequestering a metal ion and preventing the metal ion from being insolubilized without causing pollution of the environment.

8 Claims, 4 Drawing Sheets

CHELATING COMPOSITION

BACKGROUND OF THE INVENTION

1. Field of the Invention

This invention relates to a chelating composition formed of a specific aliphatic polycarboxylic acid and sugar or saccharic acid. More specifically, this invention relates to a chelating composition which can be advantageously used as an agent for preventing the precipitation of a metal ion contained in cooling water for use in a cooling tower, water for use in a boiler, and the like; an agent for repressing the formation of smear on cloth due to the sedimentation of a metal ion on a cloth during the dyeing or bleaching treatment; and an additive for a fiber processing agent, a detergent in food manufacturing industry, a detergent in a chemical plant, a metal surface-treating agent, and a paper-pulp processing agent.

This invention also relates to a chelating composition to be used in a detergent for cleansing and removing stain adhering to a hard surface of glass, plastic, or metal. More specifically, this invention relates to a chelating composition to be used in a detergent which is used for cleansing and removing stain adhering to a hard surface of a package encasing provisions such as beverage and processed food, a container accommodating a package, and a pipe, a tank, a sterilizing plate, and a filling device in foodstuff production facilities by such means as immersion in, circulation and spray application of a liquid detergent, and to a chelating composition to be used in a chemical-mechanical industry grade detergent which is used for metal surface cleansing, metal cleansing, and precision cleansing. Particularly, this invention relates to a chelating composition to be used in a detergent which exhibits high cleansing power on a hard surface and, at the same time, excels in n biodegradability.

2. Description of the Related Art

Agents which are used in cleansing, dyeing, bleaching, and other various treatments given to fibers in the textile industry have incurred possibilities that their actions are obstructed by metal ions (particularly calcium ions and iron ions) contained in water. When a peroxide is used in the bleaching treatment in the presence of a metal ion, not only the metal ion promotes the decomposition of the peroxide and prevent the peroxide from manifesting satisfactory bleaching effects on a cloth but also the hydroxide of the metal ion settles possibly to such an extent as of inducing formation of smear on a cloth.

A metal ion has also incurred a possibility that when present in cooling water for a cooling tower or in water for a boiler, it will settle and eventually clog the pipe.

For the purpose of repressing the sedimentation of such a metal ion, numerous chelating agents such as, for example, ethylenediaminetetraacetic acid (EDTA), nitrilotriacetic acid (NTA), N-(hydroxyethyl)ethylenediamine-N,N',N'-triacetic acid (HEDTA), diethylenetriaminepentaacetic acid (DTPA), and polyphosphoric acid have been used.

Many of these chelating agents, while exhibiting an excellent ability to sequester metal ions, are not easily subjected to biodegradation. They incur possibilities that their plant effluents, when discharged without any treatment into the neighboring environment, will cause water pollution. Even when an activated sludge is used to treat a chelating agent, it cannot be expected to purge the effluents of the chelating agent, and therefore all possible efforts must be made to recover the chelating agent from the effluent. Further, the chelating agent itself possibly forms a cause for eutrophication and induces abnormal growth of microorganisms.

It has been known that particularly an iron ion, among other metal ions, tends to settle as a hydroxide at high pH levels. No existing chelating agents, however, have been proposed which are capable of sequestering iron ions at a high pH level and preventing them from settling.

Recently, the amounts of production of provisions such as beverages and processed foods have been steadily growing year after year and the varieties of these provisions have been diversifying as well. The hygienic quality controls imposed on the provisions, consequently, have been gaining in severity. Particularly, the trend of the provisions toward diversification of variety has been enhancing the chances of necessitating changes in variety. As a result, the foodstuff production facilities have been inevitably compelled to undergo frequent cleaning. This cleaning of the production facilities has heretofore resorted to a procedure which comprises dismantling a given production facilities, immersing the separated parts in a cleansing liquid, and rubbing them therein as with a brush.

In consequence of the dimensional growth of production facilities and the increase in frequency of the cleaning which are prevalent in recent years, however, the cleaning of these production facilities by the procedure involving such steps as dismantling and rubbing has become difficult because it calls for so much time and labor as to boost the cost of production to a prohibitive extent. In these circumstances, such methods as a procedure of circulation cleaning which consists in circulating a cleansing liquid through production facilities wished to be cleaned and a procedure of stationary cleaning (CIP) which consists in cleansing and removing stain adhering to a surface having a large area such as of a tank by spraying a cleansing liquid thereto have been adopted recently in place of the method as mentioned above.

Accompanying the growing trend of provisions toward the diversification of variety mentioned above, plastic, metal, and various other materials have come to be adopted in addition to the conventional glass materials for the packages of provisions. The diversification of materials for packages and the diversification of shapes of packages entail possibilities that the conventional cleansing liquid would fail to cleanse and remove stain sufficiently. Further, in recent years, owing to the uplift of the spirit for the protection of the environment, the glass packages whose reuse for the sake of contribution to the recycle of natural resources has come to induce revival of attention, like other reusable packages, have been urging the development of a detergent having a sufficient cleansing power to cleanse and remove stain of metal, adhesive agent, etc. eluting from a label in addition to the conventional stain.

As detergents for use in the circulation cleaning or stationary cleaning of production facilities as mentioned above or in the cleaning of packages, it has been heretofore customary to use an aqueous detergent solution containing 1 to 3% by weight of an alkali metal hydroxide and 0.2 to 0.4% by weight of an alkali metal salt of ethylenediaminetetraacetic acid (chelating compound). The detergents which use a surfactant as a main component, contain additionally such an alkali salt as carbonate, silicate, or phosphate which has relatively weak alkalinity, and an alkali metal salt of aspartic acid-N,N-diacetic acid, and find utility mainly in household applications have been also known (see EP-A-513,948, U.S. Pat. No. 3,637,511, and DE-B-2,220,295).

Although the aforementioned aqueous detergent solution containing the alkali metal salt of ethylenediaminetetraacetic acid indeed excels in the ability to cleanse and remove stain adhering to a surface of production facilities and packages, it suffers deficiency in the biodegradability. It, therefore, is not necessarily desirable from the viewpoint of the existent environmental protection to use this aqueous detergent solution in a foodstuff production plant, because the waste of this solution discharged from the plant undergoes no satisfactory biodegradation by the conventional treatment with activated sludge.

As mentioned above, numerous studies have been contemplated for developing a composition which combines a strong detergent power with excellent biodegradability. None of the compositions developed to date fully reconcile the capacity for detergency and the biodegradability.

SUMMARY OF THE INVENTION

An object of this invention, therefore, is to provide a chelating composition which excels in ability to form a chelate with a metal ion, particularly an iron ion, and is easily subjected to biodegradation and consequently has a low risk to pollute the environment.

Another object of this invention is to provide a chelating composition which manifests great ability to sequester a metal ion within a wide pH range and effectively precludes a metal ion, particularly an iron ion, from settling in the form of a hydroxide.

Still another object of this invention is to provide a chelating composition suitable for the chemical and mechanical industry grade detergent which is used for purging a glass, plastic, or metallic article of stain adhering to the surface thereof by means of metal surface cleaning, metal cleansing, and precision cleansing, for example.

Yet another object of this invention is to provide a chelating composition suitable for the detergent which efficiently cleanses and removes stain adhering to a glass, plastic, or metallic article, specifically stain adhering to a hard surface of a package encasing provisions such as beverages and processed foods, a container accommodating the package, and a pipe, a tank, a sterilizing plate, and a filling device of foodstuff production facilities, and has excellent biodegradability as well as both excellent abilities as mentioned above.

The present inventors have made a diligent study with a view to solving the problems of prior art as mentioned above and have consequently found that a chelating composition which is formed of an aliphatic polycarboxylic acid of the formula (I):

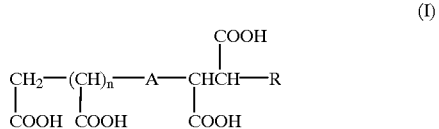

wherein A stands for an imino group or an oxygen atom, R stands for a hydrogen atom or a hydroxyl group, and n is 0 or 1, and specific sugar or saccharic acid markedly excels in the ability to sequester a metal ion or prevent a metal ion from insolubilization, namely manifests synergistic effects, as compared with the component compounds used independently.

The present inventors have also found that the chelating composition mentioned above possesses great ability to sequester a metal ion within a wide pH range as compared with the conventional chelating agents and thus can prevent an iron ion from being precipitated in the form of hydroxide.

The present inventors have further found that since the chelating composition mentioned above is efficiently decomposed by such means as known activated sludge, it avoids polluting the environment and thus has a low risk to pollute the environment.

Further, the present inventors have found that the chelating composition mentioned above affords a detergent and a detergent composition both capable of maintaining great ability to cleanse and remove stain and meanwhile behaving tenderly to the environment without polluting the environment because it possesses the ability to cleanse and remove efficiently stain adhering to a hard surface and combines excellent biodegradability with the two properties as well and, therefore, succumbs to efficient decomposition by such known means as the treatment with activated sludge. The present invention has been perfected based on the knowledge mentioned above.

Specifically, this invention provides a chelating composition which contains an aliphatic polycarboxylic acid of the formula (I):

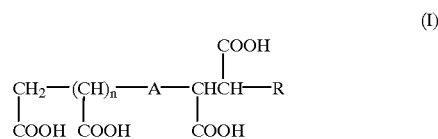

wherein A stands for an imino group or an oxygen atom, R stands for a hydrogen atom or a hydroxyl group, and n is 0 or 1, or the salt thereof and sugar or saccharic acid of 4 to 12 carbon atoms at such a ratio as enables the components to manifest synergistic effects.

The above and other objects, features and advantages of the present invention will become clear from the following description of the preferred embodiments taken in conjunction with the accompanying drawings.

The chelating composition of this invention markedly excels in the ability to sequester a metal ion or prevent it from being insolubilized as compared with the component compounds used independently and, therefore, is capable of effectively sequestering the metal ion and preventing the metal ion from being insolubilized without polluting the environment.

Further, the chelating composition of this invention admits no possibilities of polluting the environment in the light of the spirit of cherishing the existing terrestrial environment because the compound of the formula (I) possesses excellent biodegradability and succumbs to decomposition by the known means such as the treatment with activated sludge as compared with the conventional detergents.

The chelating composition of this invention can efficiently remove stain adhering to a glass bottle returned from the market while maintaining the excellent biodegradability because it possessed great ability to remove diatomaceous earth.

Further, the chelating composition of this invention can also effectively purge a beer tank of stain adhering thereto because it excels in the ability to dissolve calcium oxalate which is the main component of stain of the beer tank.

DESCRIPTION OF THE PREFERRED EMBODIMENTS OF THE INVENTION

Figure 1:
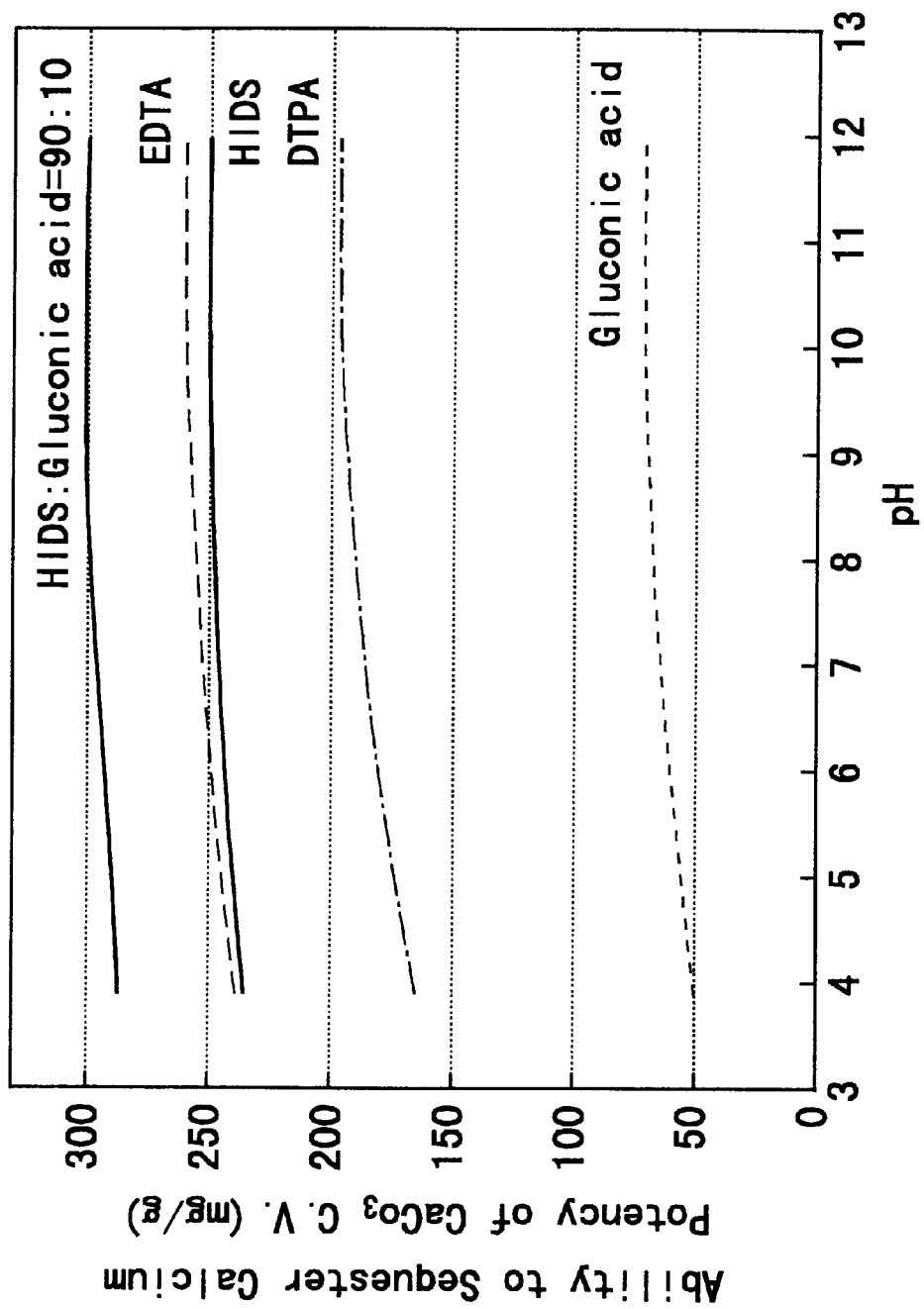
FIG. 1 is a graph showing the ability of the chelating composition of this invention to sequester calcium.

According to the first aspect, this invention relates to a chelating composition containing an aliphatic polycarboxylic acid of the following formula (I):

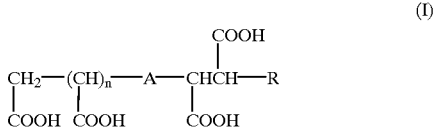

wherein A is an imino group or an oxygen atom, R is a hydrogen atom or a hydroxyl group, and n is 0 or 1, or a salt thereof and sugar or saccharic acid of 4 to 12 carbon atoms at such a ratio as enables the components to manifest synergistic effects.

As typical examples of the aliphatic polycarboxylic acid of the above formula (I), the following compounds may be cited.

1) 2-(1,2-Dicarboxyethylimino)-3-hydroxybutane diacid (HIDS) wherein in the formula (I), A stands for an imino group, R or a hydroxyl group, and n is 1;

2) Carboxymethylimino-3-hydroxybutane diacid (CIMM) wherein in the formula (I), A stands for an imino group, R for a hydroxyl group, and n is 0;

3) 2- (1, 2-Dicarboxyethylimino) butane diacid (IDS) wherein in the formula (I), A stands for an imino group, R for a hydrogen atom, and n is 1;

4) Carboxymethyliminobutane diacid (CMIS) wherein in the formula (I), A stands for an imino group, R for a hydrogen atom, and n is 0;

5) 2-(1,2-Dicarboxyethoxy)-3-hydroxybutane diacid (IMS) wherein in the formula (I), A stands for an oxygen atom, R for a hydroxyl group, and n is 1;

6) Carboxymethoxy-3 -hydroxybutane diacid (TMA) wherein in the formula (I), A stands for an oxygen atom, R for a hydroxyl group, and n is 0;

7) 2-(1,2-Dicarboxyethoxy)butane diacid (ODS) wherein in the formula (I), A stands for an oxygen atom, R for a hydrogen atom, and n is 1; and 8) Carboxymethoxybutane diacid (CMOS) wherein in the formula (I), A stands for an oxygen atom, R for a hydrogen atom, and n is 0.

In the formula (I) as mentioned above, R is preferred to denote a hydroxyl group and/or A an imino group. Specifically, among the aliphatic polycarboxylic acids enumerated above, HIDS, CIMM, IDS, CMIS, TMS, and TMA prove favorable and HIDS and TMS prove particularly favorable.

Optical isomers are possibly present in some of the aliphatic polycarboxylic acids of the formula (I). This invention allows use of their racemic modifications. It otherwise allows the individual optical isomers to be used independently of one another as by synthesizing the individual optical isomers or separating the relevant racemic modifications, for example.

According to this invention, it is preferable to use the aliphatic polycarboxylic acid of the formula (I) in the form of a salt. As typical examples of the form of salt, salts of such alkali metals as sodium, potassium, and lithium; salts of such alkaline earth metals as calcium and magnesium; amine salts including such alkyl amines as monoethyl amine, diethyl amine, and triethyl amine, salts of such alkanol amines as monoethanol amine, diethanol amine, and triethanol amine, and salts of such polyamines as ethylene diamine and triethylene diamine; and ammonium salts may be cited. Among other salts enumerated above, salts of such alkali metals as sodium and potassium and ammonium salts prove particularly preferable. As concerns the carboxyl groups participating in the formation of the aliphatic polycarboxylic acid, three or four carboxyl groups may form any of the salts mentioned above or a part of these carboxyl groups, e.g. one, two, or three carboxyl groups, may form such salts. Preferably at least two carboxyl groups assume the form of salts. The aliphatic polycarboxylic acids of the formula (I) and the salts thereof may be used either singly or in the form of a mixture of two or more members. Incidentally, the aliphatic polycarboxylic acids of the formula (I) and the salts thereof will not pollute the environment because they are easily decomposed as with activated sludge, for example.

As typical examples of the sugar of 4 to 12 carbon atoms to be used in this invention, monosaccharides such as erythrose, arabinose, and glucose; disaccharides such as maltose, lactose, and sucrose; erythritols such as erythritol; pentitols such as arabitol, ribitol, and xylitol; and hexytols such as sorbitol, mannitol, and galactitol may be cited. Among other sugars mentioned above, sorbitol may be used particularly preferably as the sugar according to this invention. These sugars may be used in any of the forms such as D form, L form, or the form of mixture thereof.

As typical examples of the saccharic acid of 4 to 12 carbon atoms to be used in this invention, aldonic acids such as arabonic acid, gluconic acid, and galactonic acid; aldaric acids such as trihydroxyglutaric acid, glucaric acid, and mucic acid; and glucoheptoic acid may be cited. Among other saccharic acids enumerated above, the alkali metal salts of gluconic acid may be particularly preferably used as saccharic acids according to this invention. These saccharic acids may be used in any of the forms such as D form, L form, or the form of mixture thereof.

This invention allows the sugars or saccharic acids mentioned above to be used in the form of salts such as, for example, salts of such alkali metals as sodium, potassium, and lithium; salts of such alkaline earth metals as calcium and magnesium; amine salts including such alkyl amines as monoethyl amine, diethyl amine, and triethyl amine, and salts of such alkanol amines as monoethanol amine; and salts with ammoniacal bases such as ammonium salts.

In this invention, the sugar and/or saccharic acid may be used either singly or in the form of a combination of two or more members. The sugar and/or saccharic acid is preferred to be selected among gluconic acid, sorbitol, and mixtures thereof. Particularly, it is preferred to contain gluconic acid.

The ratio of the aliphatic polycarboxylic acid of the formula (I) to the sugar and/or saccharic acid varies with such factors as the kinds of aliphatic polycarboxylic acid, sugar, and saccharic acid to be used. It impose no particular restriction but only requires the relevant components to manifest synergistic effects aimed at. The ratio of the aliphatic polycarboxylic acid of the formula (I) to the sugar and/or saccharic acid is generally in the range of 98/2 to 50/50, preferably 95/5 to 70/30, and more preferably 90/10 to 80/20.

The method for mixing the aliphatic polycarboxylic acid of the formula (I) with the sugar and/or saccharic acid imposes no particular restriction but only requires the relevant components to be mixed substantially uniformly. For example, a method which consists in mixing the components both in a powdered state and a method which comprises mixing them both in the form of an aqueous solution maybe cited. The chelating composition of this invention, depending on the conditions of use, maybe put to use as mixed with a diluent. The chelating composition of this invention may be either in the form of powder or liquid.

The chelating composition of the present invention can be advantageously used as an agent for preventing the precipitation of a metal ion contained in cooling water for use in a cooling tower, water for use in a boiler, and the like; an agent for repressing the formation of smear on cloth due to the sedimentation of a metal ion on the cloth during the dyeing or bleaching treatment; and an additive for a fiber processing agent, a detergent in food manufacturing industry, a detergent in a chemical plant, a metal surface treating agent, and a paper and pulp processing agent.

The chelating composition of this invention, depending on the purpose for which it is used, can be put to use with a surfactant added.

The surfactant to be used effectively herein may be any of the surfactants heretofore known to the art. As typical examples thereof, anionic surfactants such as sodium stearate, sodium palmitate, sodium laurate, and sodium laurylbenzene sulfonate; nonionic surfactants such as polyoxyethylene alkyl ether and nonylphenyl polyoxyethylene alkyl ether; and cationic surfactants such as dodecylmethyl ammonium chloride, N-alkylpyridium halide, and tetraalkyl ammonium may be cited. Among other surfactants enumerated above, sodium laurate is used particularly advantageously.

The chelating composition of this invention can be used at a ratio, for example, in the range of 1 to 30 parts by weight, preferably 3 to 20 parts by weight, based on 100 parts by weight of the surfactant mentioned above.

The chelating composition of this invention can incorporate therein another component except for the surfactant mentioned above. In this case, as typical examples of the another component, the following compounds may be cited.

(1) Inorganic builder (a) Silicates such as aluminosilicates and crystalline silicates;

(b) Alkaline salts such as sodium carbonate, potassium carbonate, sodium bicarbonate, sodium sulfite, and sodium sesquicarbonate;

(c) Neutral salts such as sodium sulfate; and (d) Phosphates such as orthophosphates, pyrophosphates, tripolyphosphates, metaphosphates, hexamethaphosphates, and phytic acid (salts of such alkali metals as sodium and potassium).

(2) Organic builder (a) Salts of phosphonic acids such as ethane-1,1-diphosphonic acid, ethane-1,2-diphosphonic acid, ethane-1-hydroxy-1,1-diphosphonic acid and the derivatives thereof, ethane hydroxy-1,1,2-triphosphonic acid, ethane-1,2-dicarboxy-1,2-diphosponic acid, and methane hydroxy phosphonic acid;

(b) Salts of phosphonocarboxylic acids such as 2-phosphonobutane-1,2-dicarboxylic acid, 1-phosphonobutane-2,3,4-tricarboxylic acid, and α-methylphosphonosuccinic acid;

(c) Salts of amino acids such as aspartic acid and glutamic acid;

(d) Aminopolyacetates such as nitrilotriacetates, ethylene diaminetetraacetates, and diethylene diaminepentaacetates;

(e) Polyelectrolytes such as polyacrylic acid, polyglyoxylic acid, polyaconitic acid, polyitaconic acid, polycitraconic acid, polyfumaric acid, polymaleic acid, polymesaconic acid, poly-α-hydroxyacrylic acid, polyvinyl phosphonic acid, sulfonated polymaleic acid, maleic anhydride-diisobutylene copolymer, maleic anhydride-styrene copolymer, maleic anhydride-methylvinyl ether copolymer, maleic anhydride-ethylene copolymer, maleic anhydride-ethylene cross-linked copolymer, maleic anhydride-vinyl acetate copolymer, maleic anhydride-acrylonitrile copolymer, maleic anhydride-acrylic ester copolymers, maleic anhydride-butadiene copolymer, maleic anhydride-isoprene copolymer, poly-β-keto-carboxylic acid derived from maleic anhydride and carbon monoxide, itaconic acid-ethylene copolymer, itaconic acid-aconitic acid copolymer, itaconic acid-maleic acid copolymer, itaconic acid-acrylic acid copolymer, malonic acid-methylene copolymer, itaconic acid-fumaric acid copolymer, acrylic acid-maleic acid copolymer, ethylene glycol-ethylene terephthalate copolymer, vinyl pyrrolidone-vinyl acetate copolymer, 1-butene-1,3,4-tricarboxylic acid-itaconic acid-acrylic acid terpolymer, polyester polyaldehyde carboxylic acid possessed of a quaternary ammonium group, cis-isomer of epoxysuccinic acid, poly[N,N-bis-(carboxymethyl) acrylamide], poly(oxycarboxylic acid), starch succinic esters, starch maleic esters, starch terephthalic esters, starch phosphoric esters, dicarboxy starch, dicarboxy methyl starch, carboxymethyl cellulose succinic esters, and polyaspartic acid;

(f) Undissociated polymers such as polyethylene glycol, polyvinyl alcohol, polyvinyl pyrrolidone, carboxymethyl cellulose, and cold water-soluble urethanated polyvinyl alcohol; and (g) Organic acid salts such as of benzenepolycarboxylic acids represented by diglycolic acid, cyclopentane-1,2,3,4-tetracarboxylic acid, tetrahydrofuran-1,2,3,4-tetracarboxylic acid, tetrahydrofuran-2,2,5,5-tetracarboxylic acid, citric acid, lactic acid, and mellitic acid, ethane-1,1,2,2-tetracarboxylic acid, ethene-1,1,2,2- tetracarboxylic acid, butane-1,2,3,4-tetracarboxylic acid, propane-1,2,3-tricarboxylic acid, butane- 1,4-dicarboxylic acid, oxalic acid, sulfosuccinic acid, decane-1,10-dicarboxylic acid, sulfotricarbarylic acid, sulfoitaconic acid, and malic acid.

(3) Bleaching agent

Sodium percarbonate, sodium perborate, hydrogen peroxide adduct to sodium sulfate, and etc.

(4) Bleaching activating agent

Tetraacetylethylenediamine, acetoxybenzenesulfonates, and etc.

(5) Enzyme

Hydrolases, hydrases, oxide reductases, desmolases, transferases, isomerases, and etc.

As typical examples of the hydrolase, pepsine, trypsin, chymotrypsin, collagenase, keratinase, esterase, subtilisin, BPN, papain, bromelain, carboxypeptitase A and B, aminopeptitase, aspargilopeptitase A and B, proteases such as Sabinase and Alkalase (produced by Novo Industry Co.), API21 (produced by Showa Denko K.K.), and Maxacal (produced by Gist-Brocades), esterases such as gastric lipase, pancreatic lipase, vegetable lipases, phospholipases, choline esterases, and phosphatases, lipases such as lipolase (produced by Novo Industry Co.), carbohydrases such as cellulase, maltase, saccharase, amylase, pectinase, lysozyme, a-glycosidase, β-glycosidase, cellulases such as Cellzyme (produced by Novo Industry Co.), and amylases such as Tarmamil (produced by Novo Industry Co.) may be cited.

(6) Enzyme stabilizer

Reducing agents such as sodium salts, calcium salts, and magnesium salts of sulfurous acid and hydrogen sulfite, polyols, boron compounds, and etc.

(7) Blue coloring agent (8) Caking inhibitor

Paratoluenesulfonates, xylenesulfonates, acetates, sulfosuccinates, talc, fine powdery silica, clay, magnesium oxide, and etc.

(9) Antioxidant t-Butylhydroxy toluene, 4,4'-butylidene-bis(6-t-butyl-3-methyl phenol), 2,2'-butylidene-bis(6-t-butyl-4-methyl phenol), monostyrenated cresol, distyrenated cresol, monostyrenated phenol, distyrenated phenol, 1,1'-bis(4-hydroxyphenyl)cyclohexane, and etc.

(10) Fluorescent dye 4,4'-Bis(2-sulfostyryl)-biphenyl salts, 4,4'-bis(4-chloro-3-sulfostyryl)-biphenyl salts, 2-(styrylphenyl)naphthothiazole derivatives, 4,4'-bis(triazol-2-yl)stilbene derivatives, bis(triazinylamino)stilbene disulfonic acid derivatives, and etc.

(11) Light-activated bleaching agent

Sulfonated aluminum phthalocyanine, sulfonated zinc phthalocyanine, and etc.

(12) Perfume

When the chelating composition of this invention is used in a agent for repressing the formation of smear due to the settlement of a metal ion in the dyeing or bleaching treatment, it can be suitably utilized by being added to a dye or to a bleaching agent containing such a peroxide as hydrogen peroxide or sodium peroxide. The coloration due to the settlement of a metal ion from a dye or bleaching agent can be precluded by adding the chelating composition of this invention to the dye or bleaching agent.

The chelating composition of this invention may further incorporate therein an alkali metal hydroxide.

As typical examples of the alkali metal hydroxide, sodium hydroxide, potassium hydroxide, and lithium hydroxide may be cited. Among other alkali metal hydroxides cited above, sodium hydroxide and potassium hydroxide may be advantageously used.

The amount of the alkali metal hydroxide to be incorporated in the chelating composition is in the range of 0.05 to 45% by weight, preferably 2 to 10% by weight. In this case, the chelating composition proves advantageous in terms of cleansing power, ease of handling, and economy when the amount of the alkali metal hydroxide incorporated therein is in the range mentioned above.

When the chelating composition of this invention is used for cleaning a hard surface, it is preferred to incorporate therein the alkali metal hydroxide as mentioned above. The amount of the alkali metal hydroxide to be incorporated, for example, is in the range of 0.05 to 45% by weight, preferably 2 to 10% by weight. The amount of the compound of the formula (I) to be incorporated is in the range of 0.05 to 45% by weight, preferably 0.1 to 10% by weight, and the amount of the sugar or saccharic acid or the salt thereof to be incorporated is in the range of 0.001 to 10% by weight, preferably 0.003 to 1% by weight. The definition of the range for the amount of the alkali metal hydroxide to be incorporated is for the same reason as given above. In this case, the compound of the aforementioned formula (I) proves advantageous in terms of cleansing power, ease of handling, and economy when the amount of this compound is in the range as mentioned above. The sugar or saccharic acid or the salt thereof to be incorporated proves advantageous in terms of cleansing power, ease of handling, and economy when the amount thereof is in the range mentioned above.

When the chelating composition of this invention is to be used for cleaning a hard surface, it can be manufactured, for example, by a simple procedure of mixing substantially uniformly the compound of the formula (I), the alkaline metal hydroxide, and the sugar and/or saccharic acid (inclusive of the salt thereof). In this case, the method for effecting the substantially uniform mixture is not particularly limited and may be selected arbitrarily among well-known methods in the art. The components may be mixed either in the form of powder or in the form of liquid.

When the chelating composition of this invention is to be used for cleaning a hard surface, it may be put to use directly or as mixed with a diluent, depending on the purpose for which the composition is used. It may be used either in the form of powder or in the form of liquid.

Further, when the chelating composition of this invention is to be used for cleaning a hard surface, it may incorporate therein as occasion demands a known detergent, a copolymer containing as components thereof acrylic acid or an alkali metal salt thereof and maleic acid or an alkali metal salt thereof and having a molecular weight exceeding 3,000, preferably in the range of 3,000 to 70,000, hexametaphosphoric acid and/or an alkali metal salt thereof as an agent for preventing the formation of scale, a well-known detergent auxiliary, etc.

The chelating composition of this invention, which comprises a specific aliphatic polycarboxylic acid and specific sugar or saccharic acid, can be advantageously used as an agent for preventing the precipitation of a metal ion contained in cooling water for use in a cooling tower, water for use in a boiler, and the like; an agent for repressing the formation of smear on cloth due to the sedimentation of a metal ion on a cloth during the dyeing or bleaching treatment; and an additive for a fiber processing agent, a detergent in food manufacturing industry, a detergent in a chemical plant, a metal surface-treating agent, and a paper-pulp processing agent. Further, the chelating composition of this invention can be also advantageously used for cleansing and removing stain adhering to a hard surface of glass, plastic, or metal, more specifically, for cleansing and removing stain adhering to a hard surface of a package encasing provisions such as beverage and processed food, a container accommodating a package, and a pipe, a tank, a sterilizing plate, and a filling device in foodstuff production facilities by such means as immersion in, circulation and spray application of a liquid detergent, as well as for chemical-mechanical industry grade cleansing which is used in metal surface cleansing, metal cleansing, and precision cleansing. The chelating composition of this invention can be particularly advantageously used for the chemical and mechanical industry grade detergent which is intended for metal surface cleansing, metal cleansing, and precision cleansing, the stationary cleaning of a pipe, a tank (a fermentation tank of beer, for example), a sterilizing plate, and a filling device, and the cleaning of a glass bottle for beer and juice and other glass packages.

Now, this invention will be described more specifically below with reference to working examples. It should be noted, however, that this invention is not limited in any sense by these working examples.

EXAMPLE 1

An aqueous 2% by weight HIDS solution was prepared by dissolving 2 g of HIDS in 100 ml of deionized water. Then an aqueous 2% by weight sodium gluconate solution was prepared by dissolving 2 g of sodium gluconate in 100 ml of deionized water. In an Erlenmeyer flask, 500 ml in inner volume, 18 ml of the aqueous 2% by weight HIDS solution and 2 ml of the aqueous 2% by weight sodium gluconate solution prepared as described above were placed. To the resultant mixed solution, 160 ml of deionized water and 10 ml of an aqueous 2% by weight sodium hydroxide solution were added and thoroughly mixed and the resultant mixture was confirmed by analysis to have a pH value of not less than 12. When this mixture was found to have a pH value of less than 12, it was adjusted to a pH value of not less than 12 by further addition of the aqueous 2% by weight sodium hydroxide solution. The mixture and 10 ml of a freshly prepared aqueous 4% by weight ferrous sulfate heptahydrate solution added thereto were immediately stirred and shaken in a constant temperature bath at 100° C. After this agitation was continued for minutes, the resultant mixture was cooled to room temperature in running water. The cooled mixture was filtered and the filter paper was washed with 50 ml of deionized water. The filter paper was dried at room temperature. The residue on the filter paper was rated on the five-point scale to determine the effects of the composition. The results are shown in Table 1.

5 No residue
4 Very slight residue in ocherous color
3 Small amount of residue in ocherous to brown color
2 Residue in brown to dark brown color
1 Residue in black color

EXAMPLES 2 TO 17

Compositions were manufactured by following the procedure of Example 1 while using such components in such ratios as are shown in Table 1 and were rated for their effects. The results are shown in Table 1.

TABLE 1

| | Composition $CH_2-(CH)_n-A-CH-CH-R$ with X on each C | | | | | | | | |
|---|---|---|---|---|---|---|---|---|---|
| Example | A | X | R | n | Acronym | Concentration | Concentration of gluconic acid | Concentration of sorbitol | Results |
| 1 | —NH— | —COONa | OH | 1 | HIDS | 18 g/l | 2 g/l | | 5 |
| 2 | —NH— | —COONa | H | 1 | IDS | 18 g/l | 2 g/l | | 5 |
| 3 | —NH— | —COONa | OH | 0 | CIMM | 18 g/l | 2 g/l | | 5 |
| 4 | —O— | —COONa | OH | 1 | TMS | 18 g/l | 2 g/l | | 5 |
| 5 | —O— | —COONa | H | 0 | CMOS | 18 g/l | 2 g/l | | 4 |
| 6 | —NH— | —COONa | OH | 1 | HIDS | 18 g/l | | 2 g/l | 5 |
| 7 | —NH— | —COONa | H | 1 | IDS | 18 g/l | | 2 g/l | 4 |
| 8 | —O— | —COONa | OH | 1 | TMS | 18 g/l | | 2 g/l | 5 |
| 9 | —NH— | —COONa | OH | 1 | HIDS | 19 g/l | 1 g/l | | 4 |
| 10 | —NH— | —COONa | H | 1 | IDS | 19 g/l | 1 g/l | | 4 |
| 11 | —O— | —COONa | OH | 1 | TMS | 19 g/l | 1 g/l | | 4 |
| 12 | —NH— | —COONa | OH | 1 | HIDS | 16 g/l | 4 g/l | | 5 |
| 13 | —NH— | —COONa | H | 1 | IDS | 16 g/l | 4 g/l | | 5 |
| 14 | —O— | —COONa | OH | 1 | TMS | 16 g/l | 4 g/l | | 5 |
| 15 | —NH— | —COONa | OH | 1 | HIDS | 14 g/l | 6 g/l | | 5 |
| 16 | —NH— | —COONa | H | 1 | IDS | 14 g/l | 6 g/l | | 5 |
| 17 | —O— | —COONa | OH | 1 | TMS | 14 g/l | 6 g/l | | 5 |

Controls 1 to 8

Compositions were manufactured by following the procedure of Example 1 while using such components in such ratios as are shown in Table 2 and were rated for effect. The results are shown in Table 2.

TABLE 2

| | Composition $CH_2-(CH)_n-A-CH-CH-R$ with X on each C | | | | | | | |
|---|---|---|---|---|---|---|---|---|
| Control | A | X | R | n | Acronym | Concentration | Concentration of gluconic acid | Results |
| 1 | —NH— | —COONa | OH | 1 | HIDS | 20 g/l | | 3 |
| 2 | —O— | —COONa | OH | 1 | TMS | 20 g/l | | 3 |
| 3 | Ethylenediaminetetraacetic acid | | | | EDTA | 20 g/l | | 1 |
| 4 | Diethylenetriaminepentaacetic acid | | | | DTPA | 20 g/l | | 2 |
| 5 | Nitrilotriacetic acid | | | | NTA | 20 g/l | | 2 |
| 6 | Ethylenediaminetetraacetic acid | | | | EDTA | 18 g/l | 2 g/l | 2 |
| 7 | Diethylenetriaminepentaacetic acid | | | | DTPA | 18 g/l | 2 g/l | 3 |
| 8 | Nitrilotriacetic acid | | | | NTA | 18 g/l | 2 g/l | 3 |

It is clear from Table 1 that the chelating compositions according to this invention could prevent an iron ion from settling by forming a chelate compound with the iron ion. In contrast, it is clearly noted from Table 2 that the conventional chelating compositions could not prevent an iron ion from settling because they formed a chelate compound insufficiently with the iron ion.

EXAMPLE 18

A solution (A) was prepared by dissolving 1.77 g of HIDS in 100 ml of deionized water. Separately, a solution (B) was prepared by dissolving 1.77 g of sodium gluconate in 100 ml of deionized water. Further, a solution (C) was prepared by dissolving calcium carbonate in deionized water at a concentration of 0.1 mol/liter. The following buffer solutions were prepared for the purpose of adjusting the determined pH values to prescribed levels.

For pH 4, Acetic acid-sodium acetate buffer solution (prepared by mixing 16.4 ml of 0.2N acetic acid with 3.6 ml of 0.2M of sodium acetate)

For pH 7, potassium dihydrogen phosphate-disodium hydrogen phosphate buffer solution (prepared by mixing 4.0 ml of 1/15M $KH_2PO_4$ with 6.0 ml of 1/15M $Na_2HPO_4$)

For pH 10, boric acid+potassium chloride-sodium hydroxide buffer solution (prepared by mixing 50 ml of 0.2M $H_3BO_3$+0.2M KCl with 43.90 ml of 0.2N NaOH and 106.10 ml of water)

For pH 12, disodium hydrogen phosphate-sodium hydroxide buffer solution (prepared by mixing 50 ml of 0.1M $Na_2HPO_4$ with 43.2 ml of 0.1M NaOH and 6.8 ml of water)

To 30 ml of the buffered solution fitting the determined pH value, 9 ml of the solution (A) and 1 ml of the solution (B) were added and 5 ml of the solution (C) was further added. Then, to the resultant mixed solution, 5 ml of an aqueous 1.0 mol/liter potassium nitrate solution was added for adjusting the intensity of pH.

A calcium ion selecting electrode was immersed in the mixed solution. The potential after 10 minutes was read out of the electrode.

Separately, a calibration curve of calcium ion concentration was produced by using as the standard solution a solution containing calcium ion at a known concentration. The free calcium ion concentration of the solution was found by referring the potential reading mentioned above to the calibration curve. The difference of the free calcium ion concentration deducted from the total amount of calcium ion was reported as the amount of calcium ion sequestered (amount of sequestered calcium). The results are shown in Table 5.

EXAMPLES 19 TO 21

Compositions were manufactured by following the procedure of Example 18 while using such components in such ratios as are shown in Table 3 and were tested in the same manner as in Example 18 to determine the amount of calcium sequestered. The results are shown in Table 5.

TABLE 3

| | Composition | | | | | | |
|---|---|---|---|---|---|---|---|
| | $CH_2$—$(CH)_n$—A—CH—CH—R | | | | | | |
| | X | X | | X | X | | |
| Example | A | X | R | n | Acronym | Concentration | Concentration of gluconic acid |
| 18 | —NH— | —COONa | OH | 1 | HIDS | 3.18 g/l (=0.009 mole/l) | 0.35 g/l |
| 19 | —NH— | —COONa | OH | 1 | HIDS | 2.82 g/l (=0.008 mole/l) | 0.71 g/l |
| 20 | —O— | —COONa | OH | 1 | TMS | 3.19 g/l (=0.009 mole/l) | 0.35 g/l |
| 21 | —O— | —COONa | OH | 1 | TMS | 2.83 g/l (=0.008 mole/l) | 0.71 g/l |

Controls 9 to 13

Compositions were manufactured by following the procedure of Example 18 while using such components in such ratios as are shown in Table 4 and were tested in the same manner as in Example 18 to determine the amount of calcium sequestered. The results are shown in Table 4.

TABLE 4

| | Composition | | | | | | |
|---|---|---|---|---|---|---|---|
| | $CH_2$—$(CH)_n$—A—CH—CH—R | | | | | | |
| | X | X | | X | X | | |
| Control | A | X | R | n | Acronym | Concentration | Concentration of gluconic acid |
| 9 | —NH— | —COONa | OH | 1 | HIDS | 3.53 g/l (=0.010 mole/l) | |
| 10 | —O— | —COONa | OH | 1 | TMS | 3.54 g/l (=0.010 mole/l) | |

TABLE 4-continued

Composition $$CH_2-(CH)_n-A-CH-CH-R$$
$$\phantom{CH_2-}|\phantom{(CH)_n-A-}|\phantom{-}|$$
$$\phantom{CH_2-}X\phantom{(CH)_n-A-}X\phantom{-}X\phantom{-}X$$

| Control | A | X | R | n | Acronym | Concentration | Concentration of gluconic acid |
|---|---|---|---|---|---|---|---|
| 11 | | | | | | | 3.18 g/l |
| 12 | Ethylenediamine tetraacetic acid | | | | EDTA | 4.52 g/l (=0.010 mole/l) | |
| 13 | Diethylenetriamine pentaacetic acid | | | | DTPA | 5.03 g/l (=0.010 mole/l) | |

TABLE 5

| | Amount of calcium sequestered, potency of $CaCO_3$ (mg/g) | | | |
|---|---|---|---|---|
| | pH 4 | pH 7 | pH 10 | pH 12 |
| Example 18 | 287 | 294 | 300 | 300 |
| Example 19 | 255 | 263 | 270 | 270 |
| Example 20 | 288 | 293 | 300 | 300 |
| Example 21 | 256 | 264 | 270 | 270 |
| Control 9 | 238 | 245 | 250 | 250 |
| Control 10 | 236 | 242 | 247 | 247 |
| Control 11 | 50 | 60 | 70 | 70 |
| Control 12 | 240 | 252 | 260 | 260 |
| Control 13 | 165 | 183 | 195 | 195 |

Figure 2:
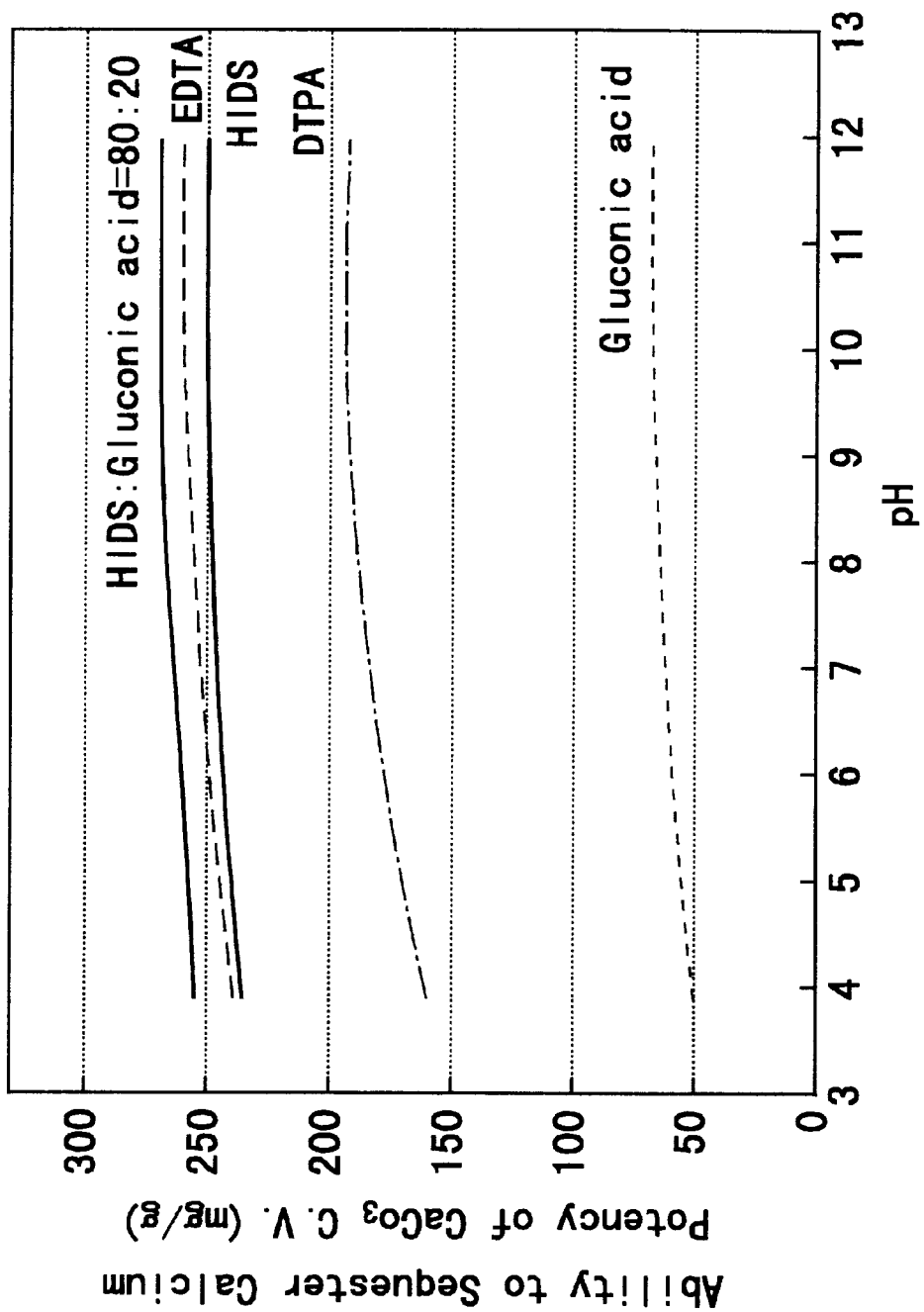
FIG. 2 is a graph showing the ability of the chelating composition of this invention to sequester calcium.
Figure 3:
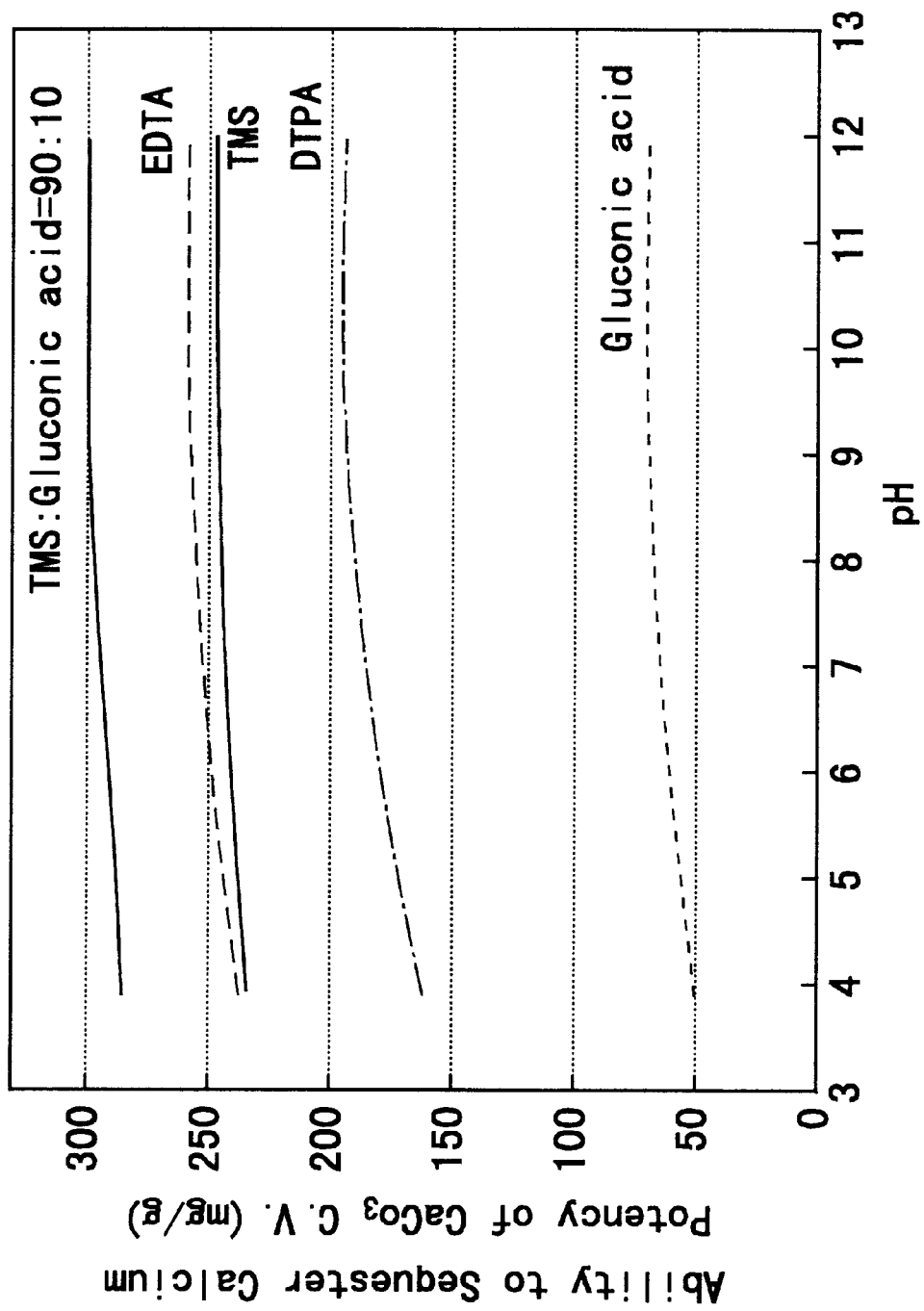
FIG. 3 is a graph showing the ability of the chelating composition of this invention to sequester calcium.
Figure 4:
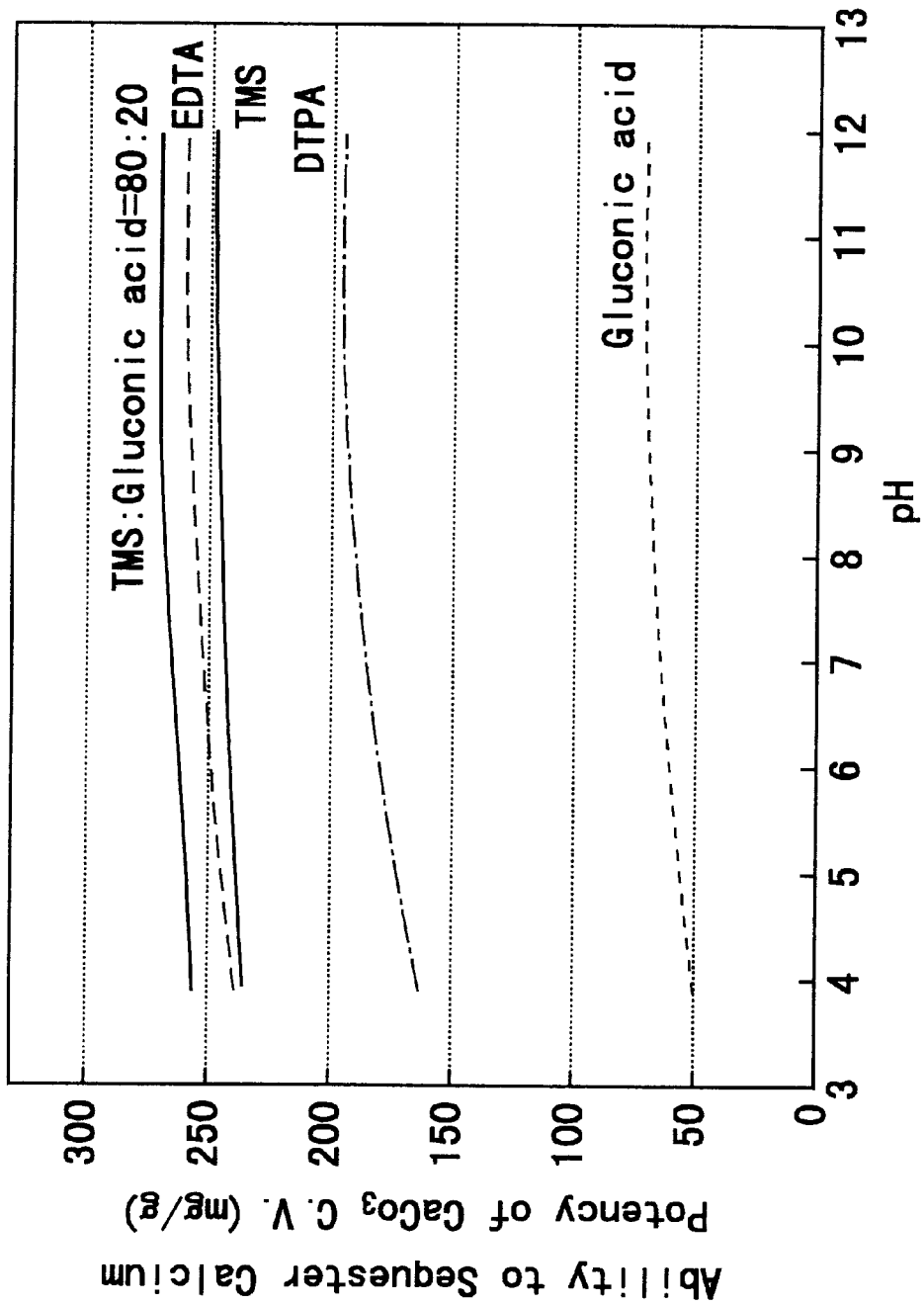
FIG. 4 is a graph showing the ability of the chelating composition of this invention to sequester calcium.

The curves obtained by plotting the data of Table 5 are shown in FIGS. 1 to 4.

It is noted from Table 5 and FIGS. 1 to 4 that the compositions of Examples 18 to 21 resulting from the addition of saccharic acid to aliphatic polycarboxylic acids of the formula (I) possessed great ability to sequester calcium as compared with those of Controls 9 to 13 using such component acids independently. This fact indicates that the mixture of the two acid components resulted in manifestation of synergistic effects.

Controls 14 to 17

The chelating compositions resulting from combining the conventional chelating agents shown on the left side below with saccharic acid were tested for ability to sequester calcium at pH 10 in the same manner as in Example 18. The results are shown in the right side below.

| | Chelating composition | Ability to sequester calcium (mg/g) |
|---|---|---|
| Control 14 | EDTA4Na, 9 parts by weight Gluconic acid, 1 part by weight | 245 |
| Control 15 | EDTA4Na, 8 parts by weight Gluconic acid, 2 part by weight | 220 |
| Control 16 | DTPA5Na, 9 parts by weight Gluconic acid, 1 part by weight | 180 |
| Control 17 | DTPA5Na, 8 parts by weight Gluconic acid, 2 part by weight | 170 |

It is noted from the results shown above that the chelating compositions of Controls 14 to 17 which contained conventional chelating agents sequestered calcium in amounts which were merely the sums of amounts apportioned to the relevant components of the compositions.

EXAMPLE 22: Test for Biodegradability

The detergent compositions shown in Table 6 below were tested for biodegradability by following the procedure of the Modified MITI Test (1) of OECD Test Guide Line 301C. The conditions for this test are shown below.

Conditions for determination
  Activated sludge: Standard activated sludge
  Culture broth: Standard culture broth

| Test conditions: | |
|---|---|
| Sample concentration | 100 ppm |
| Activated sludge concentration | 300 ppm |
| Testing temperature | 25 ± 1° C. |
| Duration of test | 28 days |

Method of analysis: Analysis of dissolved carbon by a TOC analyzer

The test was conducted under the conditions as shown above. The degree of degradation of a given sample was calculated in accordance with the following formula. The results are shown in Table 6.

Degree of degradation $(\%)=[(DOC_w-DOC_s)/DOC_w] \times 100$

In the above formula, $DOC_s$ stands for the amount of dissolved organic carbon remaining in the (sludge+sample) system and $DOC_w$ for the amount of dissolved organic carbon remaining in the (water+sample) system.

TABLE 6

| Detergent composition | | | Degree of degrad- ability (%) |
|---|---|---|---|
| Alkali metal hydroxide (%) | Chelating agent (%) | | |
| NaOH (3%) | HIDS (0.36%) | Sodium gluconate (0.04%) | 92 |
| NaOH (3%) | HIDS (0.36%) | Sorbitol (0.04%) | 93 |
| NaOH (3%) | IDS (0.36%) | Sodium gluconate (0.04%) | 96 |
| NaOH (3%) | TMS (0.36%) | Sodium gluconate (0.04%) | 83 |
| NaOH (3%) | EDTA (0.4%) | | 14 |
| NaOH (3%) | NTA (0.4%) | | 62 |
| NaOH (3%) | NTA (0.36%) | Sodium gluconate (0.04%) | 66 |

It is clearly noted from Table 6 that the compositions of this invention containing HIDS, IDS, or TMS, especially HIDS or IDS, exhibited better biodegradability than the compositions for control containing the conventional EDTA or NTA.

EXAMPLE 23: Test for Ability to Sequester Calcium Ion

The detergent compositions shown in Table 7 below were undergone to the test under the following conditions.

| | |
|---|---|
| Container | Beaker, 100 ml in inner volume |
| Amount of test solution | 50 ml |
| Concentration of aqueous calcium solution | $1.0 \times 10^{-3}$ mol/liter |
| Chelating agent | 10 mg (reduced to solids) |
| Stirring time | 10 minutes (by the use of a stirrer) |
| Temperature | 25° C. |

With a given chelating agent added and stirred under the measuring conditions as shown above, the aqueous calcium solution was tested for calcium ion concentration with a calcium ion selecting electrode (made by ORION K. K. and sold under Cat. No. 9320) using an ion meter (made by ORION K.K. and sold under Model 290A). The amount of calcium ion found by the calibration method was reduced to the amount of calcium carbonate. The result of reduction was reported as the ability of the chelating agent to sequester calcium ion.

The results are collectively shown in Table 7.

TABLE 9

| Detergent composition | | | | | Ability to sequester calcium ion $CaCO_3$ C. V. (mg/g) |
|---|---|---|---|---|---|
| Alkali metal hydroxide (%) | Chelating agent | | | | |
| NaOH 2% | HIDS | 9 mg | Sodium gluconate | 1 mg | 323 |
| NaCH 2% | HIDS | 9 mg | Sorbitol | 1 mg | 328 |
| NaOH 2% | IDS | 9 mg | Sodium gluconate | 1 mg | 366 |
| NaOH 2% | IDS | 9 mg | Sorbitol | 1 mg | 359 |
| NaOH 2% | TMS | 9 mg | Sodium gluconate | 1 mg | 384 |
| NaOH 2% | TMS | 9 mg | Sorbitol | 1 mg | 380 |
| NaOH 2% | EDTA | 10 mg | | | 282 |
| NaOH 2% | EDTA | 9 mg | Sodium gluconate | 1 mg | 256 |
| NaOH 2% | EDTA | 9 mg | Sorbitol | 1 mg | 254 |
| NaOH 2% | NTA | 9 mg | Sodium gluconate | 1 mg | 296 |
| NaOH 2% | NTA | 9 mg | Sorbitol | 1 mg | 297 |

It is clearly noted from Table 7 that the compositions of this invention containing HIDS, IDS, or TMS exhibited better ability to sequester calcium ions than the compositions for control containing the conventional EDTA or NTA.

EXAMPLE 24: Test for Cleaning Diatomaceous Earth

An artificially defiled plate was obtained by uniformly applying an aqueous 20% diatomaceous earth dispersion solution to a slide glass and then drying the applied layer of the solution at 110° C. for 14 hours. This plate was used in the test.

A given detergent composition shown in Table 8 was tested for cleaning ability under the following conditions.

| | |
|---|---|
| Temperature | 80° C. |
| Time | 10 minutes |
| Method of cleaning | Stationary immersion |

In a beaker, 300 ml in inner volume, a test solution meeting the conditions as mentioned above was produced. In the test solution, three artificially defiled plates were immersed. The plates, after standing in the solution for 10 minutes, were lightly rinsed with deionized water heated in advance to 80° C. and dried. The slide glass was tested for degree of glossiness with a glossimeter (produced by Suga Shikenki Seizo K.K. under the trademark designation of "Digital Deformation Glossimeter, UGV-40") before and after the cleaning. The ratio of removal of diatomaceous earth was calculated from the two numerical values of degree of glossiness. The results are collectively shown in Table 8.

TABLE 8

| Detergent composition | | | | Ratio of removal of diatomaceous earth (%) |
|---|---|---|---|---|
| Alkali metal hydroxide (%) | Chelating agent | | | |
| NaOH 3% | HIDS 0.45% | Sodium gluconate | 0.05% | 60 |
| NaOH 3% | HIDS 0.45% | Sorbitol | 0.05% | 74 |
| NaOH 3% | IDS 0.45% | Sodium gluconate | 0.05% | 51 |
| NaOH 3% | IDS 0.45% | Sorbitol | 0.05% | 45 |
| NaOH 3% | TMS 0.45% | Sodium gluconate | 0.05% | 42 |
| NaOH 3% | | | | 0 |
| NaOH 3% | EDTA 0.5% | | | 31 |
| NaOH 3% | NTA 0.45% | Sodium gluconate | 0.05% | 49 |
| NaOH 3% | NTA 0.45% | Sorbitol | 0.05% | 35 |
| NaOH 3% | | Sodium gluconate | 0.05% | 1 |
| NaOH 3% | | Sorbitol | 0.05% | 2 |

It is clearly noted from Table 8 that the compositions of this invention containing HIDS, IDS, or TMS efficiently removed stain adhering to a glass bottle as compared with the conventional controls containing EDTA or NTA. Table 8 also shows that in the compositions of this invention, those having incorporated sugar (sorbitol) or the alkali metal salt of saccharic acid (sodium gluconate) registered improved ratios of removal of diatomaceous earth, suggesting that the composition of this invention, when used for the removal of stain adhering to a glass bottle, is preferred to incorporate therein sugar or saccharic acid or the salt thereof. In these examples, the control composition containing 3% of sodium hydroxide as an alkali metal hydroxide and 0.45% of NTA and 0.05% of sodium gluconate each as a chelating agent registered the value, 49%, as the ratio of removal of diatomaceous earth, which is equivalent to the ratio of removal obtained by the composition of this invention. As demonstrated in Example 22, however, NTA was inferior in biodegradability to the composition of this invention.

EXAMPLE 25: Test for Solution of Calcium Oxalate

The compositions indicated in Table 9 were tested for solution of calcium oxalate under the following conditions.

| | |
|---|---|
| Container | Stoppered Erlenmeyer flask, 300 ml in inner volume |
| Amount of test solution | 200 ml |
| Cleaning time | 10 minutes (shaking) |
| Cleaning temperature | Room temperature |

In a shaker (produced by Taiyo Kagaku Kogyo K.K. under the trademark designation of "RECIPRO SHAKER SR-II"), 200 ml of a given test solution and 100 mg of calcium oxalate added thereto were immediately shaken for 10 minutes under the conditions as shown above. The solution fresh immediately after shaking was visually inspected to rate the condition. The rating was made on the three-point scale, wherein:

| | |
|---|---|
| ○ | Clear solution showing no discernible sign of undissolved calcium oxalate |
| Δ | Opaque solution showing sign of dissolution of calcium oxalate and yet suffering survival of undissolved calcium oxalate |
| X | Solution showing substantially no sign of dissolved calcium oxalate |

The results are collectively shown in Table 9.

TABLE 9

Composition of Detergent

| Alkali metal hydroxide (%) | Chelating agent (%) | | Result of rating |
|---|---|---|---|
| NaOH 3% | HIDS 0.36% | Sodium gluconate 0.04% | ○ |
| NaOH 3% | HIDS 0.36% | Sodium glucoheptate 0.04% | ○ |
| NaOH 3% | HIDS 0.36% | Sorbitol 0.04% | ○ |
| NaOH 3% | IDS 0.36% | Sodium gluconate 0.04% | ○ |
| NaOH 3% | IDS 0.36% | Sodium glucoheptate 0.04% | ○ |
| NaOH 3% | IDS 0.36% | Sorbitol 0.04% | ○ |
| NaOH 3% | TMS 0.36% | Sodium gluconate 0.04% | ○ |
| NaOH 3% | TMS 0.36% | Sodium glucoheptate 0.04% | ○ |
| NaOH 3% | TMS 0.36% | Sorbitol 0.04% | ○ |
| NaOH 3% | | | X |
| NaOH 3% | EDTA 0.4% | | ○ |
| NaOH 3% | NTA 0.4% | | Δ |
| NaOH 3% | NTA 0.36% | Sodium gluconate 0.04% | Δ |
| NaOH 3% | NTA 0.36% | Sorbitol 0.04% | Δ |
| NaOH 3% | | Sodium gluconate 0.04% | X |
| NaOH 3% | | Sorbitol 0.04% | X |

It is noted from Table 9 that the compositions of this invention containing HIDS, IDS, or TMS showed satisfactory ability to dissolve calcium oxalate at at least equivalent levels to that of the conventional compositions.

The entire disclosure of Japanese Patent Application Nos. 09-191537 filed on Jul. 16, 1997, and 10-106736 filed on Apr. 16, 1998 including specification, claims, drawings and summary are incorporated herein by reference in its entirety.

What is claimed is:

1. A chelating composition containing an aliphatic polycarboxylic acid of the following formula (I):

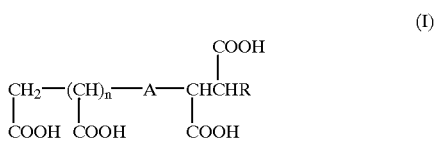

wherein A is an imino group, R is a hydrogen atom or a hydroxyl group, and n is 1; or A is an oxygen atom, R is a hydroxyl group, and n is 1, or a salt thereof; and gluconic acid; the weight ratio of the aliphatic polycarboxylic acid to gluconic acid being in a range of 95/5 to 70/30.

2. A chelating composition according to claim 1, wherein A is an imino group.

3. A chelating composition according to claim 1, wherein said weight ratio of the aliphatic polycarboxylic acid to gluconic acid is in a range of 90/10 to 80/20.

4. A chelating composition according to claim 1, which further contains an alkali metal hydroxide.

5. A chelating composition according to claim 4, wherein the amount of said alkali metal hydroxide is in the range of 0.05 to 45% by weight and the amount of gluconic acid thereof is in the range of 5 to 10% by weight.

6. A chelating composition according to claim 4 or claim 5, which is used for cleansing a hard surface.

7. A chelating composition according to claim 4, which is used for stationary cleaning.

8. A chelating composition according to claim 4, which is used for cleansing a glass product.

* * * * *